(12) United States Patent
Seo et al.

(10) Patent No.: US 9,158,053 B2
(45) Date of Patent: Oct. 13, 2015

(54) POLYMERIZABLE LIQUID CRYSTAL COMPOUNDS, LIQUID CRYSTAL COMPOSITION COMPRISING THE COMPOUNDS, AND OPTICALLY ANISOTROPIC BODY COMPRISING THE COMPOSITION

(71) Applicant: LG CHEM, LTD., Seoul (KR)

(72) Inventors: Kyung-Chang Seo, Daejeon (KR); Sung-Ho Chun, Daejeon (KR); Dai-Seung Choi, Daejeon (KR); Mi-Ra Hong, Daejeon (KR); Hyeong-Bin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 259 days.

(21) Appl. No.: 13/928,118

(22) Filed: Jun. 26, 2013

(65) Prior Publication Data
US 2014/0034883 A1    Feb. 6, 2014

(30) Foreign Application Priority Data

Jun. 28, 2012 (KR) .................. 10-2012-0070202
Jun. 26, 2013 (KR) .................. 10-2013-0073694

(51) Int. Cl.

| | | |
|---|---|---|
| F21V 9/00 | (2015.01) | |
| G02B 5/02 | (2006.01) | |
| G02C 7/10 | (2006.01) | |
| G02F 1/361 | (2006.01) | |
| G03B 11/00 | (2006.01) | |
| G02B 5/32 | (2006.01) | |
| C09K 19/32 | (2006.01) | |
| G02B 5/30 | (2006.01) | |
| C09K 19/00 | (2006.01) | |
| C09K 19/04 | (2006.01) | |
| G02F 1/13363 | (2006.01) | |

(52) U.S. Cl.
CPC . *G02B 5/32* (2013.01); *C09K 19/32* (2013.01); *C09K 19/321* (2013.01); *C09K 19/322* (2013.01); *G02B 5/3016* (2013.01); *C09K 2019/0448* (2013.01); *G02F 1/13363* (2013.01)

(58) Field of Classification Search
USPC .................. 252/299.01, 299.62, 582; 349/96; 427/520; 428/1.2; 526/281; 560/56, 75
See application file for complete search history.

(56) References Cited

U.S. PATENT DOCUMENTS

2010/0304148 A1    12/2010   Hirai et al.
2011/0051050 A1 *   3/2011   Shin et al. ................. 349/96

FOREIGN PATENT DOCUMENTS

JP       2009-029929      *   2/2009   .............. C88F 28/18
JP       2009029929 A         2/2009

\* cited by examiner

*Primary Examiner* — Bijan Ahvazi
(74) *Attorney, Agent, or Firm* — Dentons US LLP

(57) ABSTRACT

The present invention relates to a polymerizable liquid crystal compound, a liquid crystal composition including the same, and an optically anisotropic body. The polymerizable liquid crystal compound according to the present invention has not only high birefringence but also excellent coating orientation, and thus it is possible to prepare a optically anisotropic body which is thin but superior in optical properties.

8 Claims, 2 Drawing Sheets

| Compound | Degree of Light Leakage | Compound | Degree of Light Leakage |
|---|---|---|---|
| RM-07 |  | RM-08 |  |
| RM257 |  | - | - |

| Compound | Degree of Light Leakage | Compound | Degree of Light Leakage |
|---|---|---|---|
| RM-01 |  | RM-02 |  |
| RM-03 |  | RM-04 |  |
| RM-05 |  | RM-06 |  |

| Compound | Degree of Light Leakage | Compound | Degree of Light Leakage |
|---|---|---|---|
| RM-07 |  | RM-08 |  |
| RM257 |  | - | - |

POLYMERIZABLE LIQUID CRYSTAL COMPOUNDS, LIQUID CRYSTAL COMPOSITION COMPRISING THE COMPOUNDS, AND OPTICALLY ANISOTROPIC BODY COMPRISING THE COMPOSITION

TECHNICAL FIELD

The present invention relates to a polymerizable liquid crystal compound, a liquid crystal composition including the same, and an optically anisotropic body.

BACKGROUND OF ART

A phase retarder is a type of optical element changing the polarization state of light passing through the same, and equally said a wave plate. When a light passes through an electromagnetic phase retarder, the polarization direction (direction of electric field vector) becomes a sum of two elements (an ordinary ray and an extraordinary ray) parallel or perpendicular to the optic axis, and changes after passing the phase retarder because the vector sum of two elements varies according to the birefringence and the thickness of the phase retarder.

Recently, one of big issues of preparing optical film which can be used to the phase retarder is to prepare a high performance film at a small charge. Because, when liquid crystal compounds having high birefringence are used for preparing an optical film, it is possible to realize the necessary retardation value with small quantity of liquid crystal compounds. And, when such liquid crystal compounds are used, it is possible to prepare a thinner folial film.

Therefore, many studies for obtaining the liquid crystal compounds having high birefringence have been carried out actively, but there was a limitation on applying them to the industry in practice because of the orientation problem of the membrane when prior liquid crystal compounds were coated on a film.

DETAILED DESCRIPTION OF THE INVENTION

Technical Problem

Therefore, it is an aspect of the present invention to provide a polymerizable liquid crystal compound having high birefringence and showing excellent orientation when it is coated.

It is another aspect of the present invention to provide a polymerizable liquid crystal composition including the compound.

It is still another aspect of the present invention to provide an optically anisotropic body including the polymer prepared from the polymerizable liquid crystal composition.

Technical Solution

According to one embodiment of the present invention, a polymerizable liquid crystal compound represented by Chemical Formula 1 is provided:

$$L^1\text{-}J^1\text{-}G^1\text{-}E^1\text{-}D^1\text{-}A\text{-}D^2\text{-}E^2\text{-}G^2\text{-}J^2\text{-}L^2 \quad \text{[Chemical Formula 1]}$$

in Chemical Formula 1,

A is a bicyclic hydrocarbon;

$D^1$, $D^2$, $G^1$, and $G^2$ are independently a single bond or a divalent connecting group;

$E^1$ and $E^2$ are independently benzene ring or naphthalene ring, and at least one of $E^1$ and $E^2$ is naphthalene ring;

$J^1$ and $J^2$ are independently a single bond, a $C_1$-$C_{10}$ alkylene group or a divalent connecting group; and $L^1$ and $L^2$ are independently hydrogen or a polymerizable group.

Furthermore, according to another embodiment of the present invention, a polymerizable liquid crystal composition including the compound represented by Chemical Formula 1 is provided.

And, according to still another embodiment of the present invention, an optically anisotropic body including a hardened material or polymer of the polymerizable liquid crystal compound is provided.

Advantageous Effects

The polymerizable liquid crystal compound according to the present invention has not only high birefringence but also excellent coating orientation, and thus it can provide an optically anisotropic body which is thin but superior in optical properties.

DETAILED DESCRIPTION OF THE EMBODIMENTS

Figure 1:
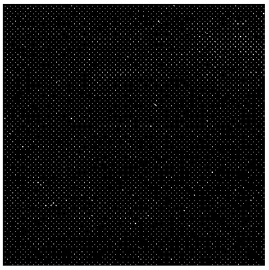
FIGS. 1 and 2 are photos of the retardation films including the compounds of Examples and Comparative Examples taken in order to check the light leakage.
Figure 1:
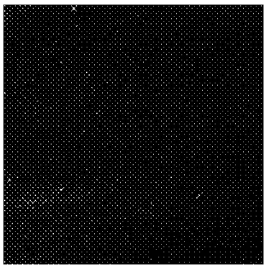
Figure 1:
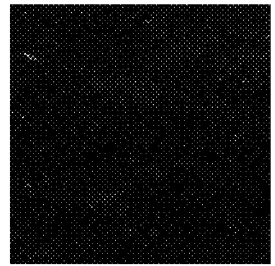
Figure 1:
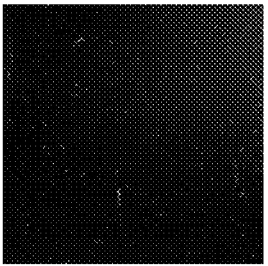
Figure 1:
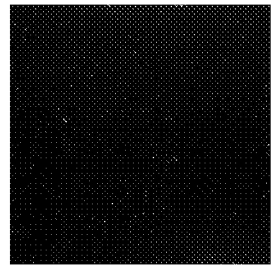
Figure 1:
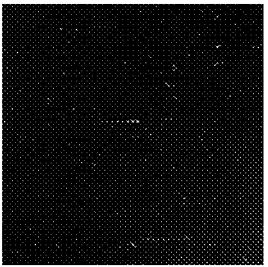

Hereinafter, the polymerizable liquid crystal compound, the polymerizable liquid crystal composition including the same, and the optically anisotropic body according to the embodiments of the present invention are explained in more detail.

Before that, unless there is overt mention about them in the present specification, technical terms used in the specification are just for representing a specific embodiment and they are not intended to limit the present invention.

And, the singular words used here include plural meaning unless the words represent apparent opposite meaning.

And, the meaning of 'include' used in the present specification specifies specific characteristics, territories, essences, steps, motions, elements, or components, and it does not exclude the addition of other specific characteristics, territories, essences, steps, motions, elements, or components.

Meanwhile, the 'polymerizable liquid crystal compound' is a liquid crystal compound having a polymerizable group, and it is possible to prepare a polymer having a fixed orientation structure of liquid crystal molecules by exposing the compound to an active energy ray after aligning a liquid crystal composition including at least one of the polymerizable liquid crystal compound in a liquid crystal state. The polymer obtained like this shows anisotropy in physical properties such as refractive index, dielectric constant, magnetic susceptibility, modulus, thermal expansion rate, and so on. And, for example, it may be applied to an optically anisotropic body such as a retardation plate, a polarizing plate, a polarizing prism, a brightness enhancing film, a covering material of optical fiber, and so on. And, for example, the properties such as transparency, strength, coatability, solubility, crystallinity, heat resistance, and so on are important besides the anisotropy of the polymer.

As the result of repeating studies for the liquid crystal compound, the present inventors found that the polymerizable liquid crystal compound having the chemical structure like the following Chemical Formula 1 has not only high birefringence but also excellent orientation in coating process and makes it possible to prepare an optically anisotropic body having excellent optical properties with thin thickness, and accomplished the present invention.

According to one embodiment of the present invention, the polymerizable liquid crystal compound represented by the following Chemical Formula 1 is provided:

$$L^1\text{-}J^1\text{-}G^1\text{-}E^1\text{-}D^1\text{-}A\text{-}D^2\text{-}E^2\text{-}G^2\text{-}J^2\text{-}L^2 \quad \text{[Chemical Formula 1]}$$

in Chemical Formula 1,

A is a bicyclic hydrocarbon;

$D^1$, $D^2$, $G^1$, and $G^2$ are independently a single bond or a divalent connecting group;

$E^1$ and $E^2$ are independently benzene ring or naphthalene ring, and at least one of $E^1$ and $E^2$ is naphthalene ring;

$J^1$ and $J^2$ are independently a single bond, a $C_1$-$C_{10}$ alkylene group or a divalent connecting group; and $L^1$ and $L^2$ are independently hydrogen or a polymerizable group.

The polymerizable liquid crystal compound represented by Chemical Formula 1 may have a structure that a bicyclic hydrocarbon and at least one naphthalene ring are introduced to a mesogen compound at the same time, and thus it can exhibit high birefringence and show excellent orientation when it is coated.

According to the present invention, A in Chemical Formula 1 is a bicyclic hydrocarbon, and it may be a $C_4$-$C_{10}$ bicyclic hydrocarbon, and preferably may be bicyclo[2.2.1]heptane or bicyclo[2.2.2]octane.

And, in Chemical Formula 1, $D^1$, $D^2$, $G^1$, and $G^2$ may be independently a single bond or a divalent connecting group. Here, the 'divalent connecting group' may be —O—, —S—, —CO—, —COO—, —OCO—, —O—COO—, —CO—NR—, —NR—CO—, —NR—CO—NR—, —OCH$_2$—, —CH$_2$O—, —SCH—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —C=C—, or —C≡C—, and saidRmay be independently hydrogen or a $C_1$-$C_{10}$ alkyl group.

Furthermore, each of $E^1$ and $E^2$ in Chemical Formula 1 is independently benzene ring or naphthalene ring, and preferably at least one of $E^1$ and $E^2$ may be naphthalene ring.

Namely, the polymerizable liquid crystal compound of one embodiment has a divalent bicyclic hydrocarbon at its center and at least one naphthalene ring introduced in the main chain together. According to this, the polymerizable liquid crystal compound of one embodiment can show not only higher birefringence due to the synergy of the substituent and the connecting group but also superior orientation of the composition including the same when it is coated. Therefore, the compound makes it possible to prepare an optically anisotropic body which is thin but superior in optical properties.

Meanwhile, in Chemical Formula 1, said $J^1$ and $J^2$ may be independently a single bond (—), a $C_1$-$C_{10}$ alkylene group, or a divalent connecting group; said alkylene group may be preferably a $C_2$-$C_9$ alkylene group, and more preferably a $C_3$-$C_6$ alkylene group. Here, the case of that said $J^1$ or $J^2$ is single bond means the structure of that said $J^1$ or $J^2$ is omitted in Chemical Formula 1.

And, in Chemical Formula 1, said $L^1$ and $L^2$ may be independently hydrogen or a polymerizable group. Here, the 'polymerizable group' can be defined as any cross-linkable or polymerizable functional group such as a unsaturated bond and (meth)acrylate group. According to the present invention, said $L^1$ and $L^2$ may be independently hydrogen, an acrylate, a methacrylate, an epoxy, and so on.

Specific examples of the polymerizable liquid crystal compound of Chemical Formula 1 may be represented by the following Chemical Formulae 2a to 2d. In Chemical Formulae 2a to 2d, n may be an integer of 1 to 10. However, the polymerizable liquid crystal compound of the present invention is not limited by or to the following exemplified compounds.

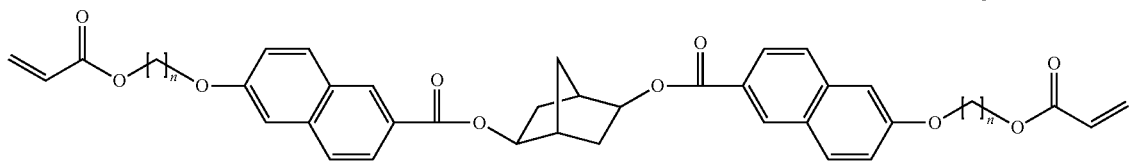

[Chemical Formula 2a]

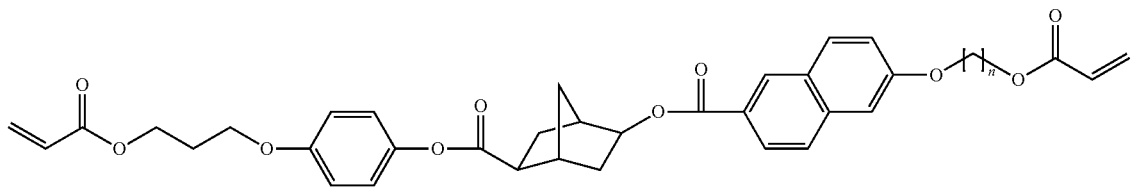

[Chemical Formula 2b]

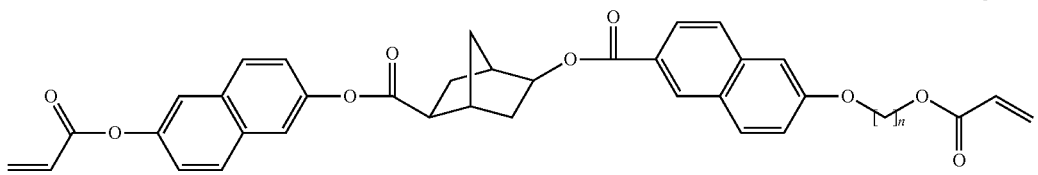

[Chemical Formula 2c]

[Chemical Formula 2d]

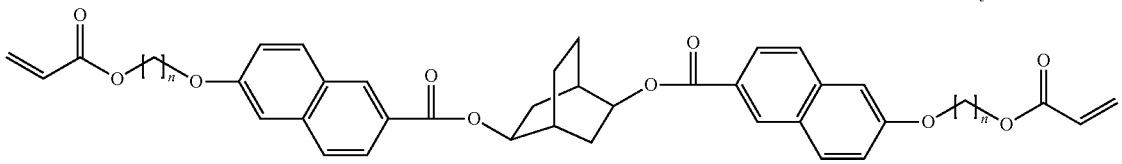

Meanwhile, the polymerizable liquid crystal compound represented by Chemical Formula 1 may be prepared by applying a known reaction, and more detailed preparation method will be disclosed in Examples of the present specification.

According to another embodiment of the present invention, the polymerizable liquid crystal composition including the compound represented by Chemical Formula 1 is provided.

The composition according to the present invention includes the compound represented by Chemical Formula 1 which is a polymerizable liquid crystal monomer, and can be homopolymerized or copolymerized by using the compound of Chemical Formula 1 alone or in combination.

The composition may further include an arbitrary liquid crystal compound in addition to the compound of Chemical Formula 1, and the arbitrary liquid crystal compound may have a polymerizable property or not. Here, for example, the arbitrary liquid crystal compound may be a liquid crystal compound having an ethylenically unsaturated bond, a compound having an optical active group, a rod-like liquid crystal compound, and the like.

At this time, the arbitrary liquid crystal compounds may be mixed with a proper amount according to their structure. Preferably, it is advantageous in the aspect of achieving the object of the present invention that the content of the compound of Chemical Formula 1 is 60 wt % or more per the total monomer weight.

The polymerizable liquid crystal composition may further include an additive such as a solvent, a polymerization initiator, a stabilizer, a liquid crystal orientation agent, a dye, a pigment, and so on. The additive may be a common component in the technical field to which the present invention pertains, and the details are not limited.

On the other hand, according to still another embodiment of the present invention, an optically anisotropic body including a hardened material or polymer of the polymerizable liquid crystal compound of Chemical Formula 1 is provided.

The optically anisotropic body may include a hardened material or polymer in which at least part of the end polymerizable groups of the polymerizable liquid crystal compound of Chemical Formula 1 is addition-polymerized or cross-linked.

Specifically, as the optically anisotropic body according to the present invention includes the hardened material or polymer of the polymerizable liquid crystal compound, the light leakage phenomenon can be disappeared or minimized with high retardation value. Furthermore, the optically anisotropic body according to the present invention is thinner than prior laminate type optically anisotropic body and can be prepared by more simplified process.

Meanwhile, the optically anisotropic body may be prepared by coating and drying the polymerizable liquid crystal composition on a substrate, aligning the liquid crystal compound, and polymerizing the same by UV irradiation.

Here, the substrate is not limited particularly but a glass plate, a poly(ethyleneterephthalate) film, a cellulose-based film, and so on may be used. In the process of coating the polymerizable liquid crystal composition on the substrate, any known methods can be used without particular limitation, and for example, a roll coating method, a spin coating method, a bar coating method, a spray coating method, and so on can be used.

And, in the process of aligning the polymerizable liquid crystal composition, any known methods can be used, for example, a method of rubbing the composition layer formed or a method of applying a magnetic field or an electric field to the composition layer formed may be used.

The thickness of the optically anisotropic body may be adjusted according to its use, and preferably it may be in the range of 0.01 to 100 μm.

Such optically anisotropic body of the present invention may be used as an optical element such as a retardation film of liquid crystal display device, an optical compensation plate, an alignment layer, a polarizing plate, a viewing angle magnification plate, a reflective film, a color filter, a holographic element, a light polarizing prism, an optical head, and the like.

Hereinafter, the function and effects of the present invention is explained in more detail by referring to specific examples of the present invention. However, the following examples are only for the understanding of the present invention and the scope of the present invention is not limited to or by them.

[Scheme 1: Examples 1 and 2]

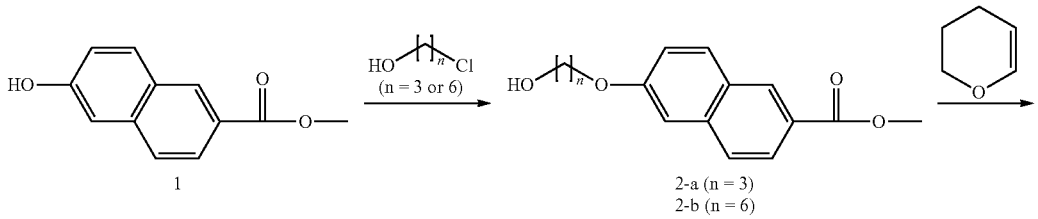

-continued

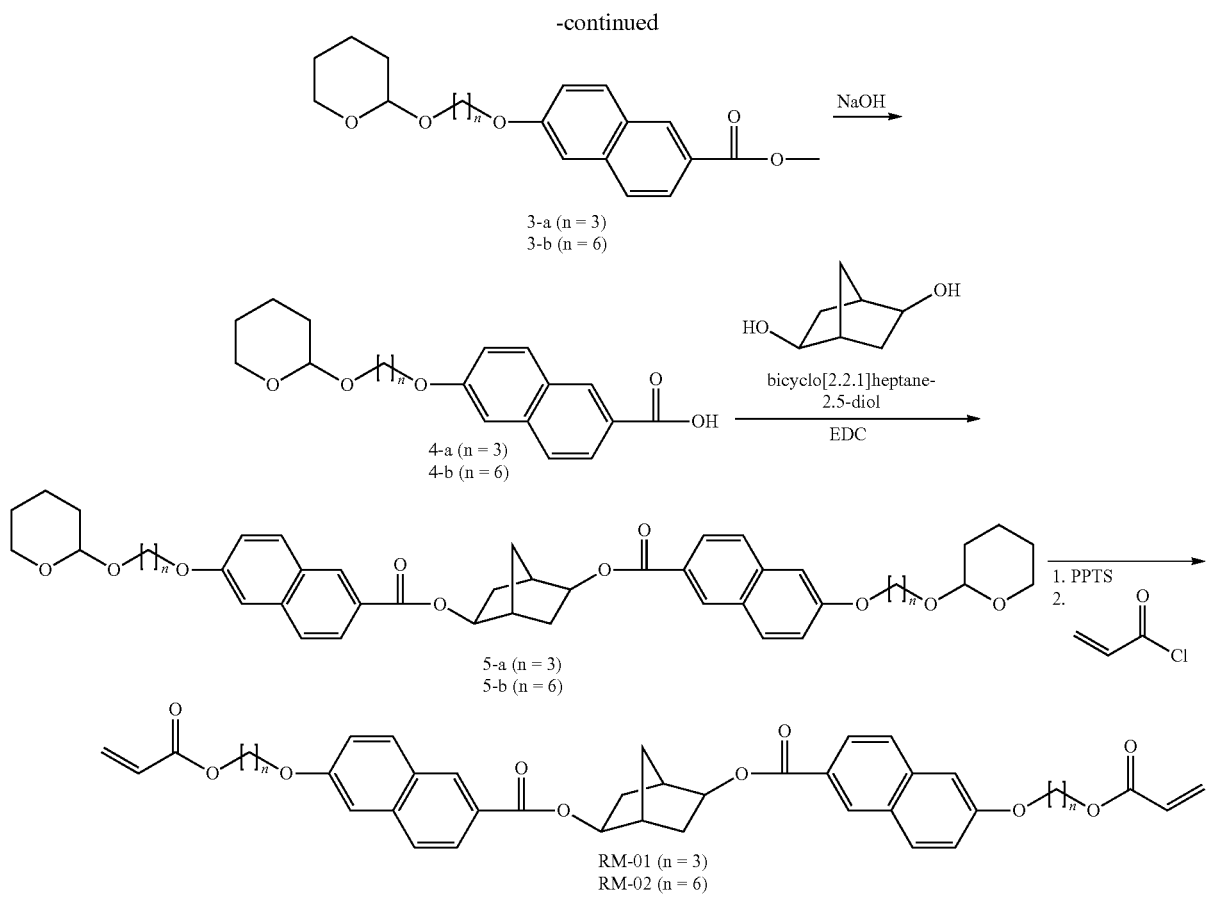

Example 1

Synthesis of Compound RM-01

(Synthesis of Compound 2-a)

In Scheme 1, after dissolving about 100 g of methyl 6-hydroxy-2-naphthoate (compound 1), about 94 g of 3-chloropropanol, and about 182 g of potassium carbonate in acetone, the solution was stirred and refluxed for about 24 hrs. After cooling the reacted mixture to room temperature, the product was filtered so as to eliminate the solid, and distilled under reduced pressure. And then, about 132 g of compound 2-a (n=3) was obtained by column chromatography purification.

(Synthesis of Compound 3-a)

After dissolving about 120 g of compound 2-a and about 21 g of PPTS (pyridinium p-toluene sulfonate) in dichloromethane, the solution was cooled to about 0° C. After adding about 42 g of 3,4-dihydro-2H-pyran dissolved in dichloromethane thereto in drops, the mixture was stirred for about 12 hrs. After washing the reacted solution with brine and chemically drying the same, about 145 g of compound 3-a (n=3) was obtained by distilling the same under reduced pressure.

(Synthesis of Compound 4-a)

After dissolving about 140 g of compound 3-a, sodium hydroxide (2M, 300 ml) was added thereto. The solution was stirred and refluxed for about 2 hrs, and distilled under reduced pressure. After dissolving the reaction product in water and dichloromethane, 3M hydrochloric acid was used so as to make the solution pH 5. The organic layer was separated from the solution, chemically dried, and distilled under reduced pressure, and about 107 g of white solid compound 4-a (n=3) was obtained by washing the same with hexane.

(Synthesis of Compound 5-a)

After dissolving about 4.2 g of norbornene-2,5-diol (namely, bicyclo[2.2.1]heptane-2,5-diol) [JCS PT1 organic & Bioorganic chemistry, 1995, 12, 1505], about 4.2 g of compound 4-a, and about 10.8 g of EDC(N-(3-dimethylaminopropyl)-N'-ethylcarbodiimide hydrochloride) in dichloromethane, the solution was cooled to about 0° C. After adding about 1.4 g of dimethyl aminopyridine and about 13.5 g of diisopropyl ethylamine thereto, the mixture was stirred for about 3 hrs. The reacted solution was diluted with dichloromethane, washed with 1N hydrochloric acid and brine, and chemically dried. The reacted product was obtained by filtration and distillation under reduced pressure. The collected product was purified by column chromatography and about 16.5 g of compound 5-a (n=3) was obtained.

(Synthesis of Compound RM-01)

After dissolving about 10 g of compound 5-a and about 0.4 g of PPTS (pyridinium p-toluene sulfonate) in tetrahydrofuran, and the mixture was stirred and refluxed for about 2 hrs. And then, the reacted solution was distilled under reduced pressure so as to remove the solvent, and the remains were diluted with dichloromethane and washed with brine. The organic layer obtained like this was chemically dried and distilled under reduced pressure, and white solid compound was obtained.

After dissolving said white solid compound in about 90 ml of dimethyl acetamide, the solution was cooled to about 0° C. After adding about 7 g of acryloyl chloride thereto in drops for 30 mins, the mixture was stirred at room temperature for about 2 hrs. The reacted solution was diluted with diethyl ether and washed with a sodium chloride aqueous solution. After collecting the organic part from the product and chemically drying the same, the solvent was eliminated by distillation under reduced pressure. The collected product was purified by column chromatography and about 9.1 g of compound RM-01 (n=3) was obtained.

NMR spectrum of compound RM-01 is as follows.

$^1$H NMR (CDCl$_3$, standard material TMS) δ(ppm): 8.47 (2H, s), 7.98 (2H, d), 7.73 (4H, m), 7.15 (2H, d), 7.06 (2H, s), 6.43 (2H, dd), 6.05 (2H, dd), 5.80 (2H, dd), 4.15 (4H, m), 4.05 (4H, m), 3.90 (2H, m), 2.00 (8H, m), 1.70 (2H, m), 1.55 (1H, m), 1.30 (1H, m)

And, the organization of compound RM-01 was observed with a polarizing microscope and the phase transition temperature was measured. As a result, when the temperature increased, the crystalline phase was changed into nematic phase at about 190° C. and isotropic liquid crystal phase appeared when the temperature exceeded about 211° C. In this way, it was recognized that compound RM-01 forms nematic phase in the temperature range of about 190° C. to 211° C.

Example 2

Synthesis of Compound RM-02

(Synthesis of Compound 2-b)
About 110 g of compound 2-b (n=6) was obtained substantially according to the same method as in the step of synthesizing compound 2-a of Example 1, except that 6-chlorohexanol was used instead of 3-chloropropanol.

(Synthesis of Compound 3-b)
About 127 g of compound 3-b (n=6) was obtained substantially according to the same method as in the step of synthesizing compound 3-a of Example 1, except that compound 2-b was used instead of compound 2-a.

(Synthesis of Compound 4-b)
About 89 g of compound 4-b (n=6) was obtained substantially according to the same method as in the step of synthesizing compound 4-a of Example 1, except that compound 3-b was used instead of compound 3-a.

(Synthesis of Compound 5-b)
About 15 g of compound 5-b (n=6) was obtained substantially according to the same method as in the step of synthesizing compound 5-a of Example 1, except that compound 4-b was used instead of compound 4-a.

(Synthesis of Compound RM-02)
About 11 g of compound RM-02 (n=6) was obtained substantially according to the same method as in the step of synthesizing compound RM-01 of Example 1, except that compound 5-b was used instead of compound 5-a.

NMR spectrum of compound RM-02 is as follows.

$^1$H NMR (CDCl$_3$, standard material TMS) δ(ppm): 8.45 (2H, s), 7.94 (2H, d), 7.70 (4H, m), 7.11 (2H, d), 7.00 (2H, s), 6.47 (2H, dd), 6.01 (2H, dd), 5.86 (2H, dd), 4.11 (4H, m), 4.01 (4H, m), 3.95 (2H, m), 2.99 (6H, m), 1.72 (4H, m), 1.51 (5H, m), 1.29 (9H, m)

And, it was found that compound RM-02 forms nematic phase in the temperature range of about 198° C. to 217° C. by the same method as in Example 1.

[Scheme 2: Example 3]

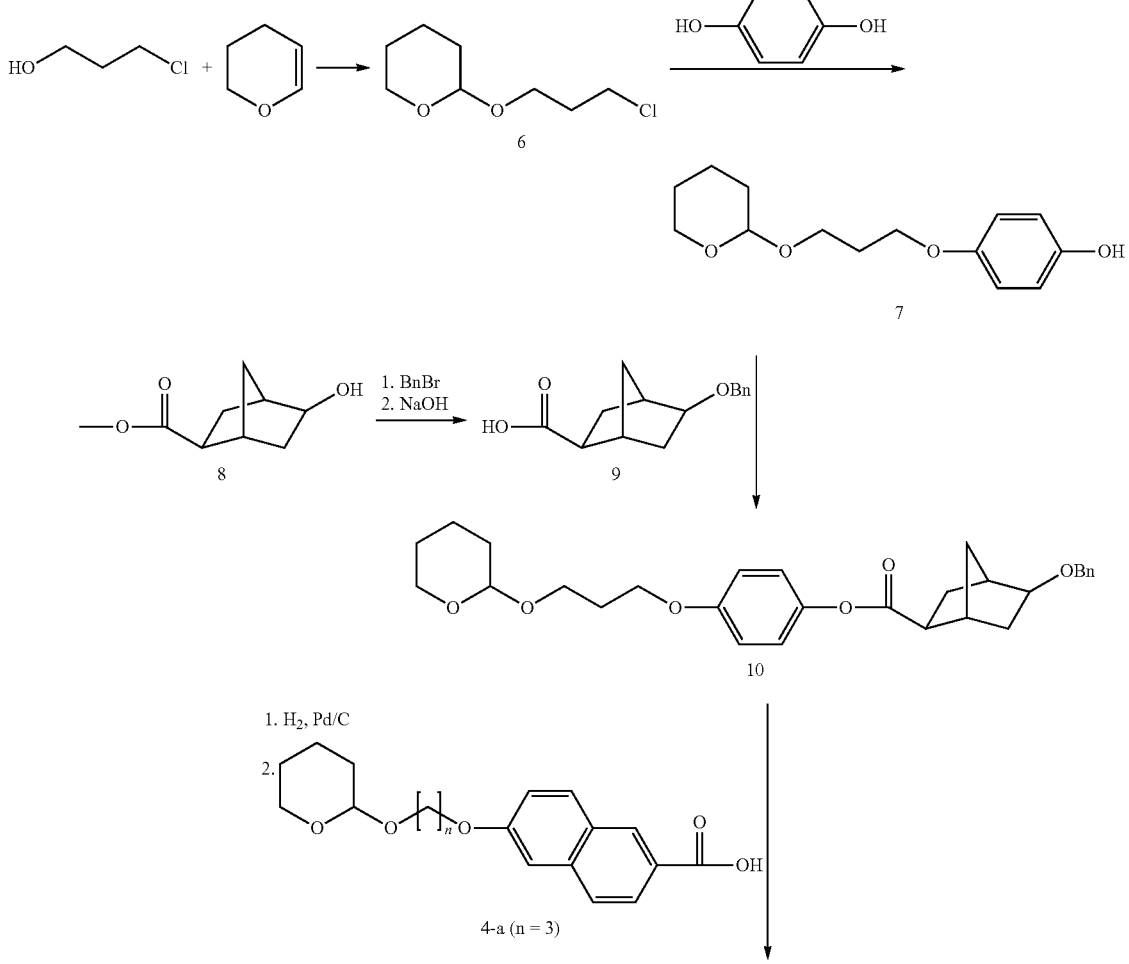

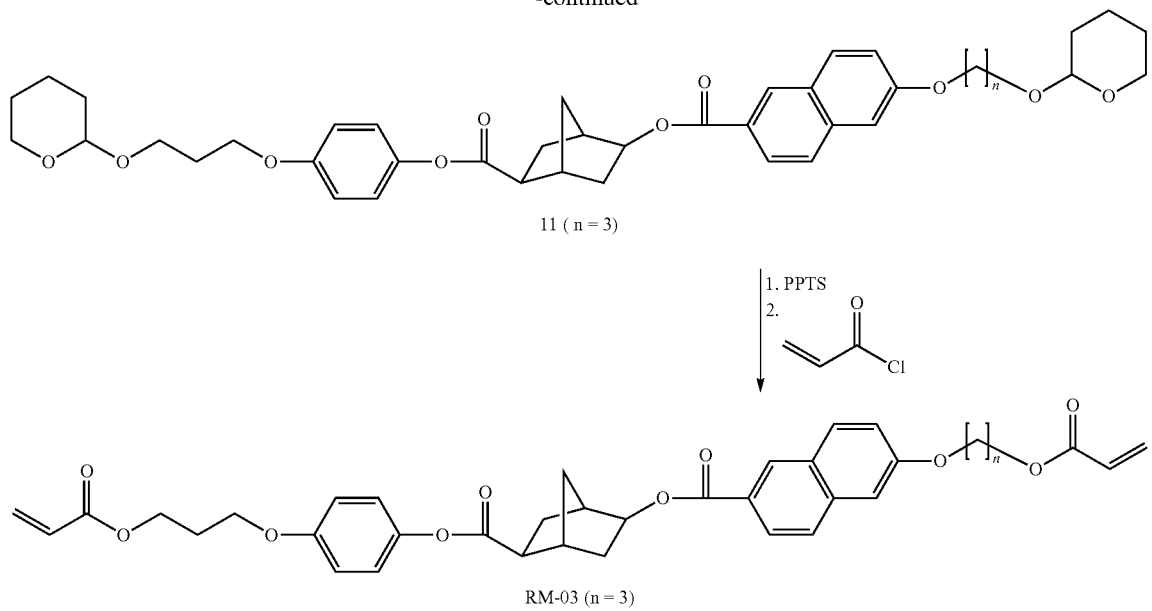

11 (n = 3)

RM-03 (n = 3)

Example 3

Synthesis of Compound RM-03

(Synthesis of Compound 7)

2-(3-chloropropoxy)tetrahydro-2H-pyran (compound 6) was synthesized according to the reference document, Organic letter, 2001, 3, 16, 2591.

After dissolving about 8.1 g of compound 6, about 10 g of 1,4-dihydroxy benzene, and about 10 g of potassium carbonate in about 100 ml of acetonitrile, the solution was stirred and refluxed for about 12 hrs. After cooling the reacted mixture to room temperature, the product was filtered so as to eliminate the solid. After distilling the reacted product under reduced pressure and dissolving the same in dichloromethane, it was washed with 1N HCl and chemically dried. The collected product was purified by column chromatography and about 8.6 g of compound 7 was obtained.

(Synthesis of Compound 9)

In Scheme 2, after dissolving about 10 g of methyl 5-hydroxybicyclo[2.2.1]heptane-2-carboxylate (compound 8) and about 20 g of benzyl bromide in about 100 ml of dichloromethane, the solution was cooled to about 0° C. After adding about 13 g of silver oxide thereto, the mixture was stirred for about 14 hrs. The product was filtered by using celite so as to eliminate the solid, and distilled under reduced pressure. After dissolving the product obtained by the distillation under reduced pressure in about 100 ml of methanol, about 10 ml of 1N sodium hydroxide was added thereto and the solution was stirred for 10 hrs. The solution was distilled under reduced pressure again so as to eliminate methanol and 5N HCl was added thereto so as to make the reaction solution acidic. And the product was extracted by dichloromethane. The obtained organic layer was chemically dried and distilled under reduced pressure, and about 12.0 g of compound 9 was obtained by purifying the same with column chromatography.

(Synthesis of Compound 10)

After dissolving about 4.2 g of compound 7, about 4.2 g of compound 9, and about 10.8 g of EDC(N-(3-dimethylaminopropyl)-N'-ethylcarbodiimide hydrochloride) in dichloromethane, the solution was cooled to about 0° C. After adding about 1.4 g of dimethyl aminopyridine and about 13.5 g of diisopropyl ethylamine thereto, the mixture was stirred for about 3 hrs. The reacted solution was diluted with dichloromethane, washed with 1N hydrochloric acid and brine, and chemically dried. The reacted product was obtained by filtration and distillation under reduced pressure. The collected product was purified by column chromatography and about 14.5 g of compound 10 was obtained.

(Synthesis of Compound 11)

After dissolving about 10 g of compound 10 and about 100 mg of catalyst (Pd/C) in 100 ml of tetrahydrofuran, the solution was stirred for 4 hrs by connecting a hydrogen balloon thereto. And then, the solution was filtered by using celite so as to eliminate the catalyst and distilled under reduce pressure.

After dissolving about 4.2 g of the distilled product, about 4.2 g of compound 4-a according to Example 1, and about 10.8 g of EDC in dichloromethane, the mixture was cooled to about 0° C. After adding about 1.4 g of dimethyl aminopyridine and about 13.5 g of diisopropyl ethylamine thereto, the mixture was stirred for about 3 hrs. The reacted solution was diluted with dichloromethane, washed with 1N hydrochloric acid and brine, and chemically dried. The reacted product was obtained by filtration and distillation under reduced pressure. The collected product was purified by column chromatography and about 13.4 g of compound 11 (n=3) was obtained.

(Synthesis of Compound RM-03)

About 9.8 g of compound RM-03 (n=3) was obtained substantially according to the same method as in the step of synthesizing compound RM-01 of Example 1, except that compound 11 was used instead of compound 5-a.

NMR spectrum of compound RM-03 is as follows.

$^1$H NMR (CDCl$_3$, standard material TMS) δ(ppm): 8.44 (1H, s), 7.92 (1H, d), 7.74 (1H, d), 7.63 (1H, d), 7.11 (1H, d), 7.00 (1H, s), 6.91 (2H, d), 6.69 (2H, d), 6.43 (2H, dd), 5.98 (2H, dd), 5.82 (2H, dd), 4.11 (4H, m), 4.00 (4H, m), 3.85 (2H, m), 2.21 (1H, m), 2.00 (8H, m), 1.73 (2H, m), 1.56 (1H, m), 1.31 (1H, m)

And, it was found that compound RM-03 forms nematic phase in the temperature range of about 185° C. to 201° C. by the same method as in Example 1.

[Scheme 3: Example 4]

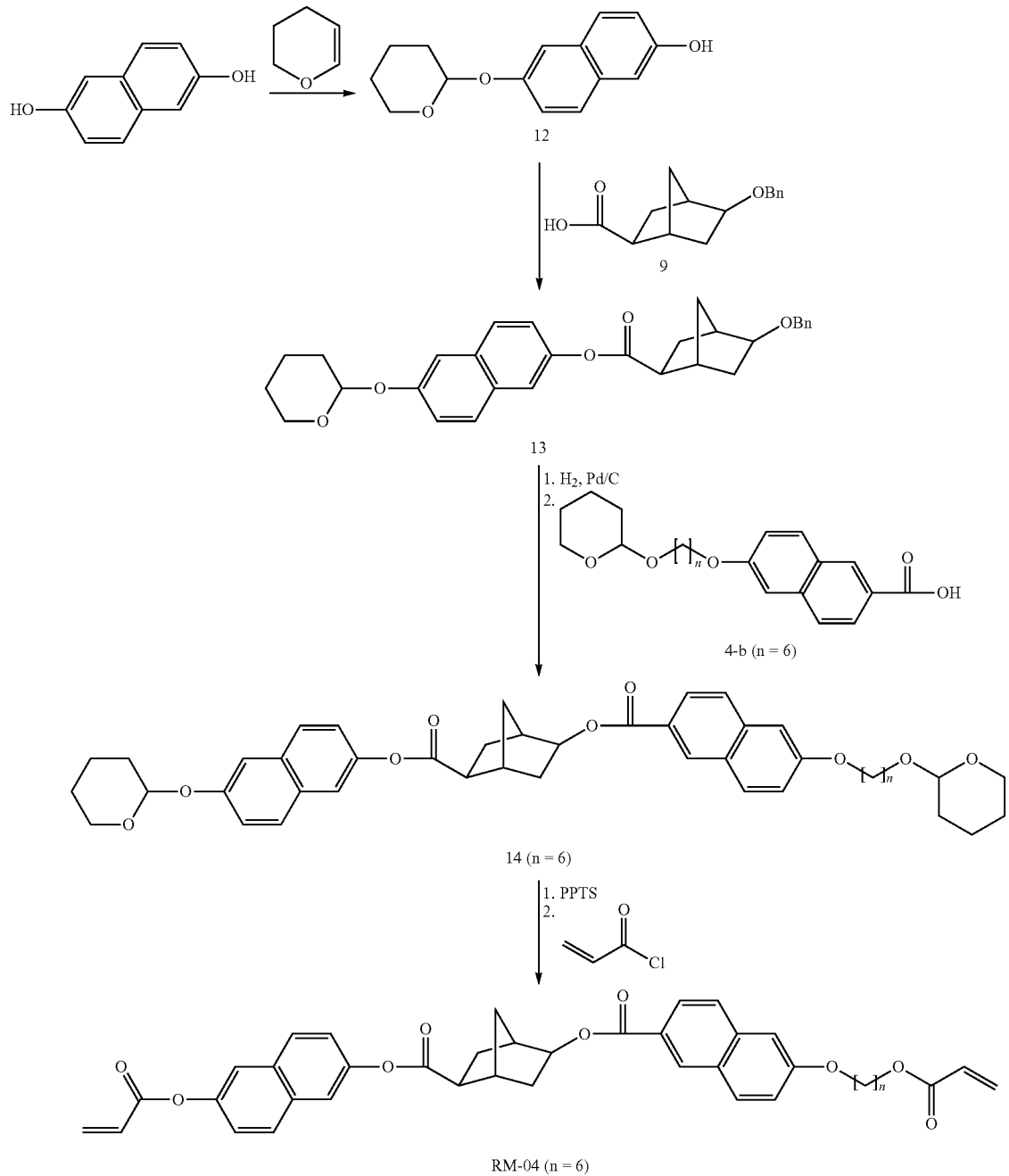

Example 4

Synthesis of Compound RM-04

(Synthesis of Compound 13)

At first, about 23 g of compound 12 was obtained from 2,6-dihydroxy naphthalene according to the method of synthesizing compound 6 of Example 3.

And then, about 21 g of compound 13 was obtained substantially according to the same method as in the step of synthesizing compound 10 of Example 3, except that compound 12 was used instead of compound 7.

(Synthesis of Compound 14)

About 16.5 g of compound 14 (n=6) was obtained substantially according to the same method as in the step of synthesizing compound 11 of Example 3, except that compound 13 was used instead of compound 10 and compound 4-b (n=6) according to Example 2 was used instead of compound 4-a.

(Synthesis of Compound RM-04)

About 14.4 g of compound RM-04 (n=6) was obtained substantially according to the same method as in the step of synthesizing compound RM-01 of Example 1, except that compound 14 was used instead of compound 5-a.

NMR spectrum of compound RM-04 is as follows.

$^1$H NMR (CDCl$_3$, standard material TMS) δ(ppm): 8.46 (1H, s), 7.93 (2H, d), 7.71 (3H, m), 7.53 (1H, d), 7.41 (1H, s), 7.05 (5H, m), 6.49 (1H, dd), 6.24 (1H, dd), 6.03 (2H, m), 5.82 (1H, dd), 5.76 (1H, dd), 4.16 (2H, m), 4.08 (2H, m), 3.91 (1H, m), 2.24 (1H, m), 2.01 (4H, m), 1.61 (4H, m), 1.56 (3H, m), 1.36 (5H, m)

And, it was found that compound RM-04 forms nematic phase in the temperature range of about 198° C. to 220° C. by the same method as in Example 1.

6.49 (2H, dd), 6.01 (2H, dd), 5.81 (2H, dd), 4.16 (4H, m), 4.01 (4H, m), 3.91 (2H, m), 2.00 (8H, m), 1.70 (2H, m), 1.46 (2H, m), 1.23 (2H, m)

And, it was found that compound RM-05 forms nematic phase in the temperature range of about 179° C. to 206° C. by the same method as in Example 1.

[Scheme 4: Examples 5 and 6]

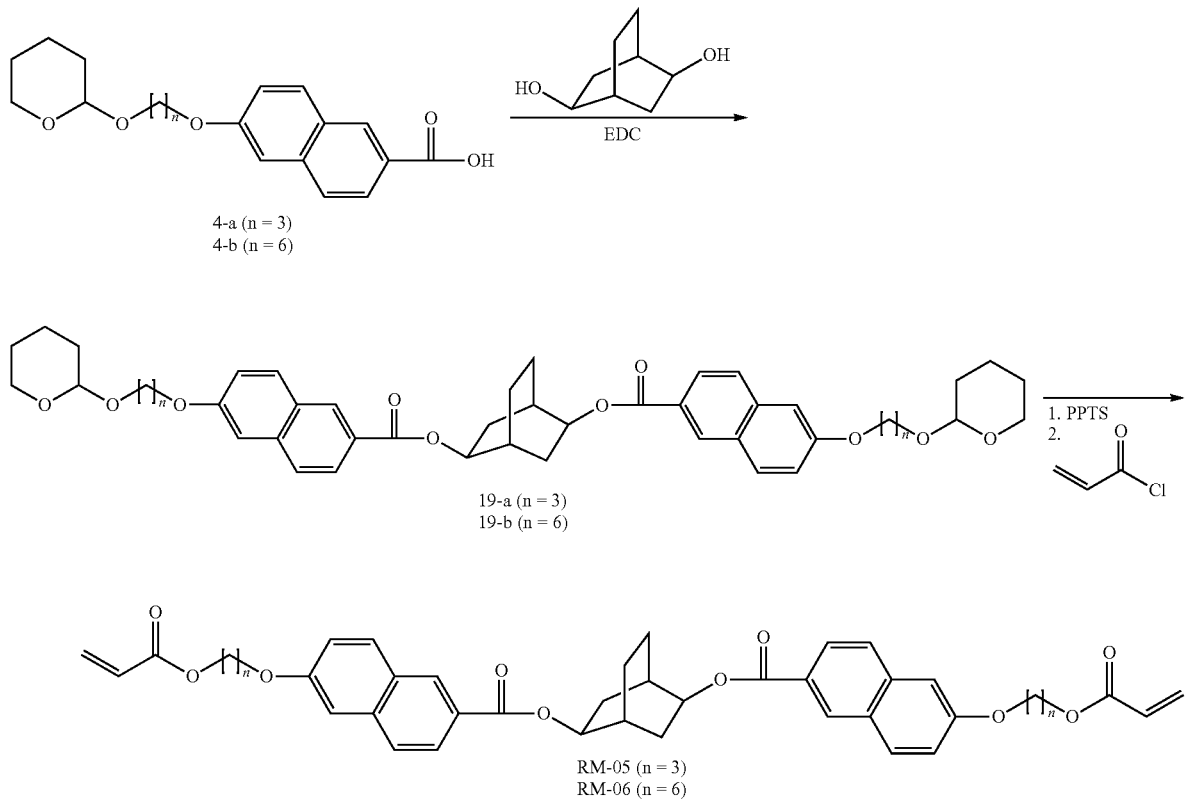

4-a (n = 3)
4-b (n = 6)

19-a (n = 3)
19-b (n = 6)

RM-05 (n = 3)
RM-06 (n = 6)

Example 5

Synthesis of Compound RM-05

(Synthesis of Compound 19-a)

About 9.5 g of compound 19-a (n=3) was obtained substantially according to the same method as in the step of synthesizing compound 5-a of Example 1, except that bicyclo[2.2.2]octane-2,5-diol was used instead of norbornene-2,5-diol.

(Synthesis of Compound RM-05)

About 10.1 g of compound RM-05 (n=3) was obtained substantially according to the same method as in the step of synthesizing compound RM-01 of Example 1, except that compound 19-a was used instead of compound 5-a.

NMR spectrum of compound RM-05 is as follows.

$^1$H NMR (CDCl$_3$, standard material TMS) δ(ppm): 8.45 (2H, s), 7.91 (2H, d), 7.70 (4H, m), 7.11 (2H, d), 7.02 (2H, s),

Example 6

Synthesis of Compound RM-06

(Synthesis of Compound 19-b)

About 12.3 g of compound 19-b (n=6) was obtained substantially according to the same method as in the step of synthesizing compound 5-a of Example 1, except that compound 4-b was used instead of compound 4-a and bicyclo[2.2.2]octane-2,5-diol was used instead of norbornene-2,5-diol.

(Synthesis of Compound RM-06)

About 11.5 g of compound RM-06 (n=6) was obtained substantially according to the same method as in the step of synthesizing compound RM-01 of Example 1, except that compound 19-b was used instead of compound 5-a.

NMR spectrum of compound RM-06 is as follows.

$^1$H NMR (CDCl$_3$, standard material TMS) δ(ppm): 8.49 (2H, s), 7.99 (2H, d), 7.73 (4H, m), 7.16 (2H, d), 7.03 (2H, s), 6.49 (2H, dd), 6.05 (2H, dd), 5.89 (2H, dd), 4.13 (4H, m), 4.05 (4H, m), 3.91 (2H, m), 1.99 (6H, m), 1.77 (4H, m), 1.57 (2H, m), 1.26 (10H, m)

And, it was found that compound RM-06 forms nematic phase in the temperature range of about 186° C. to 199° C. by the same method as in Example 1.

[Scheme 5: Comparative Examples 1 and 2]

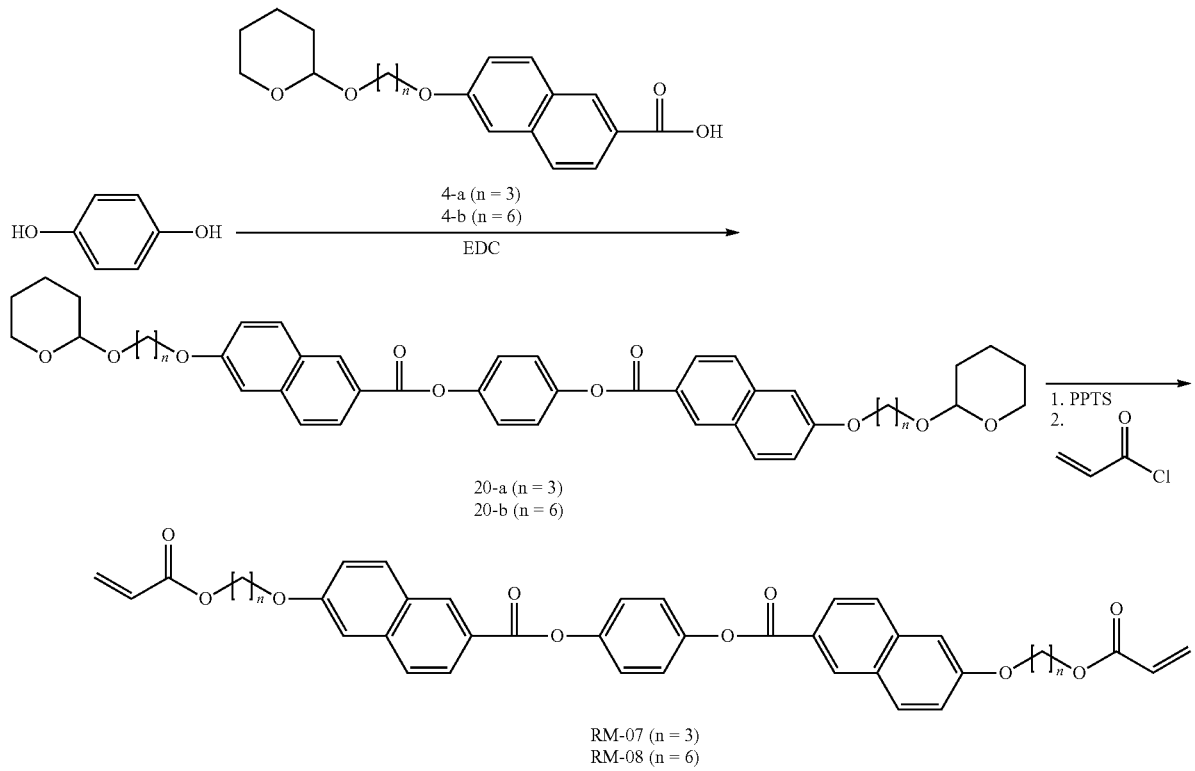

Comparative Example 1

Synthesis of Compound RM-07

(Synthesis of Compound 20-a)

After dissolving about 12.1 g of compound 4-a according to Example 1, about 3 g of 1,4-dihydroxy benzene, and about 7.2 g of EDC in dichloromethane, the solution was cooled to about 0° C. After adding about 0.9 g of dimethyl aminopyridine and about 9 g of diisopropyl ethylamine thereto, the mixture was stirred for about 3 hrs. The reacted solution was diluted with dichloromethane, washed with 1N hydrochloric acid and brine, and chemically dried. The reacted product was obtained by filtration and distillation under reduced pressure. The collected product was purified by column chromatography and about 10.5 g of compound 20-a (n=3) was obtained.

(Synthesis of Compound RM-07)

After dissolving about 10 g of compound 20-a and about 0.4 g of PPTS (pyridinium p-toluene sulfonate) in tetrahydrofuran, and the mixture was stirred and refluxed for about 2 hrs. And then, the reacted solution was distilled under reduced pressure so as to remove the solvent, and the remains were diluted with dichloromethane and washed with brine. The organic layer obtained like this was chemically dried and distilled under reduced pressure, and white solid compound was obtained.

After dissolving said white solid compound in about 90 ml of dimethyl acetamide, the solution was cooled to about 0° C. After adding about 7 g of acryloyl chloride thereto in drops for 30 mins, the mixture was stirred at room temperature for about 2 hrs. The reacted solution was diluted with diethyl ether and washed with a sodium chloride aqueous solution.

After collecting the organic part from the product and chemically drying the same, the solvent was eliminated by distillation under reduced pressure. The collected product was purified by column chromatography and about 12.0 g of compound RM-07 (n=3) was obtained.

NMR spectrum of compound RM-07 is as follows.

$^1$H NMR (CDCl$_3$, standard material TMS) δ(ppm): 8.52 (2H, s), 8.20 (2H, d), 7.75 (2H, d), 7.60 (2H, d), 7.22 (4H, s), 7.02 (4H, m), 6.44 (2H, dd), 6.09 (2H, dd), 5.90 (2H, dd), 4.04 (4H, m), 3.95 (4H, m), 1.99 (4H, m)

And, it was found that compound RM-07 forms nematic phase in the temperature range of about 225° C. to 234° C. by the same method as in Example 1.

Comparative Example 2

Synthesis of Compound RM-08

(Synthesis of Compound 20-b)

About 11.5 g of compound 20-b (n=6) was obtained substantially according to the same method as in the step of synthesizing compound 20-a of Comparative Example 1, except that compound 4-b according to Example 2 was used instead of compound 4-a.

(Synthesis of Compound RM-08)

About 11.1 g of compound RM-08 (n=6) was obtained substantially according to the same method as in the step of synthesizing compound RM-07 of Comparative Example 1, except that compound 20-b was used instead of compound 20-a.

NMR spectrum of compound RM-08 is as follows.

$^1$H NMR (CDCl$_3$, standard material TMS) δ(ppm): 8.50 (2H, s), 8.19 (2H, d), 7.73 (2H, d), 7.62 (2H, d), 7.24 (4H, s), 7.00 (4H, m), 6.45 (2H, dd), 6.07 (2H, dd), 5.91 (2H, dd), 4.14 (4H, m), 4.04 (4H, m), 1.75 (4H, m), 1.51 (4H, m), 1.29 (8H, m)

And, it was found that compound RM-08 forms nematic phase in the temperature range of about 219° C. to 227° C. by the same method as in Example 1.

Preparation Examples 1~6

Preparation of Retardation Film

A polymerizable liquid crystal composition including 25 parts by weight of compound RM-01, 5 parts by weight of photoinitiator (Irgacure 907, made by Ciba-Geigy Co., Swiss), and the rest amount of CPO (cyclopentanone) per 100 parts by weight of total composition was prepared.

The liquid crystal composition coated with a roll coating method on a COP (cycloolefin polymer) film on which norbornene-based photoaligning material was coated, and dried at about 90° C. for 2 mins so as that the liquid crystal compound was aligned. And then, the retardation film was prepared by exposing the film to a non-polarized UV from a high pressure mercury lamp of 200 mW/cm$^2$ so as to fixing the oriented state of the liquid crystal.

Like above method, the compositions including any one of compounds RM-02 to RM-06 instead of compound RM-01 were prepared, and the retardation films were prepared respectively by using the same.

Comparative Preparation Examples 1 and 2

Preparation of Retardation Film

The retardation films were prepared substantially according to the same method as in Preparation Examples 1 to 6, except that compounds RM-07 and RM-08 were used respectively instead of compound RM-01.

Reference Example

The retardation film was prepared substantially according to the same method as in Preparation Examples 1~6, except that the polymerizable liquid crystal compound (RM 257, made by XI'AN RUILIAN MODERN Co., Ltd) represented by the following Chemical Formula 10 was used instead of compound RM-01:

Experimental Example 1

Quantitative retardation values of the retardation films according to Preparation Examples 1~6, Comparative Preparation Examples 1~2, and Reference Example were measured by using Axoscan (made by Axomatrix Co.). At this time, the Δn calculated from the obtained values. The results are listed in Tables 1 and 2.

Experimental Example 2

Figure 2:
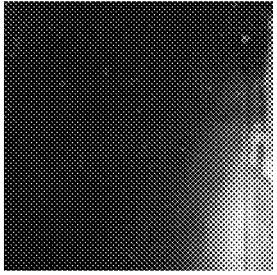
Figure 2:
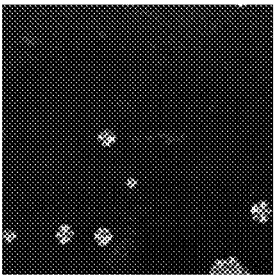
Figure 2:
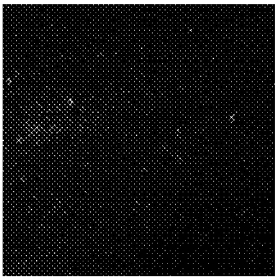

The light leakage was measured by taking photos with ECLIPSE LV100POL (made by NIKON Co.) after positioning each retardation films according to Preparation Examples 1~6, Comparative Preparation Examples 1~2, and Reference Example between two polarizers which are aligned perpendicularly. The photos classified by compounds are shown in FIGS. 1 and 2.

TABLE 1

| Compound | Δn | Compound | Δn |
|---|---|---|---|
| RM-01 | 0.19 | RM-02 | 0.18 |
| RM-03 | 0.18 | RM-04 | 0.20 |
| RM-05 | 0.18 | RM-06 | 0.17 |

TABLE 2

| Compound | Δn | Compound | Δn |
|---|---|---|---|
| RM-07 | — | RM-08 | — |
| RM257 | 0.12 | — | — |

As shown in Table 1, it was impossible to measure the accurate birefringence value of the retardation films including compound RM-07 or RM-08 because the compounds were not uniformly aligned in the preparation process.

By comparison, it was recognized that the retardation films including compounds RM-01 to RM-06 according to Preparation Examples 1~6 have higher birefringence than prior films.

Furthermore, as shown in FIGS. 1 and 2, it was recognized that the retardation films including compounds RM-01 to RM-06 according to Preparation Examples 1~6 hardly show light leakage phenomenon in comparison to the films of Comparative Preparation Examples 1~2 and Reference Example.

The invention claimed is:

1. A polymerizable liquid crystal compound represented by the following Chemical Formula 1 is provided:

$L^1$-$J^1$-$G^1$-$E^1$-$D^1$-A-$D^2$-$E^2$-$G^2$-$J^2$-$L^2$  [Chemical Formula 1]

in Chemical Formula 1,

A is bicyclo[2.2.1]heptane or bicyclo[2.2.2]octane;

$D^1$, $D^2$, $G^1$, and $G^2$ are independently a single bond or a divalent connecting group;

$E^1$ and $E^2$ are independently benzene ring or naphthalene ring, and at least one of $E^1$ and $E^2$ is naphthalene ring;

[Chemical Formula 10]

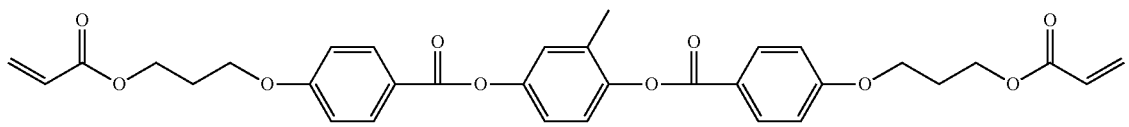

$J^1$ and $J^2$ are independently a single bond, a $C_1$-$C_{10}$ alkylene group or a divalent connecting group; and $L^1$ and $L^2$ are independently hydrogen or a polymerizable group.

2. The polymerizable liquid crystal compound according to claim 1, wherein $D^1$, $D^2$, $G^1$, and $G^2$ are independently a single bond, —O—, —S—, —CO—, —COO—, —OCO—, —O—COO—, —CO—NR—, —NR—CO—, —NR—

CO—NR—, —OCH$_2$—, —CH$_2$O—, —SCH—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —C═C—, or —C≡C—; and R is independently hydrogen or a C$_1$-C$_{10}$ alkyl group.

3. The polymerizable liquid crystal compound according to claim 1, wherein each of L$^1$ and L$^2$ is independently hydrogen, an acrylate, a methacrylate, or an epoxy.

4. A polymerizable liquid crystal composition, including the compound according to claim 1.

5. The polymerizable liquid crystal composition according to claim 4, further including a polymerization initiator and a solvent.

6. An optically anisotropic body, including a hardened material or polymer of the polymerizable liquid crystal compound of Chemical Formula 1 according to claim 1.

7. The optically anisotropic body according to claim 6, wherein the hardened material or polymer includes at least one end group that is addition-polymerized or cross-linked.

8. An optical element for liquid crystal display, including the optically anisotropic body according to claim 6.

* * * * *